April 28, 1942.   R. T. HENNESSY   2,281,098
CONNECTOR
Filed April 26, 1941
Fig. 1.
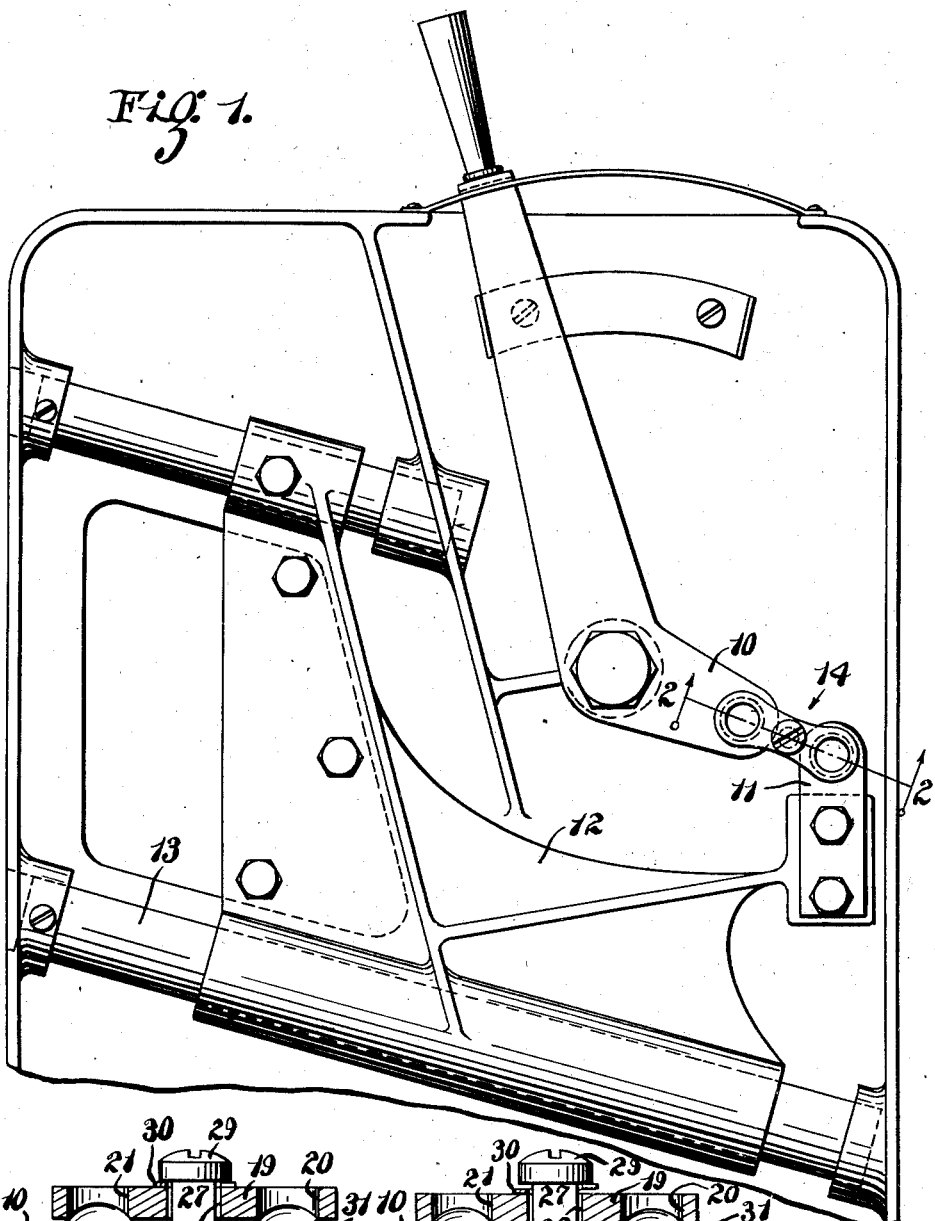
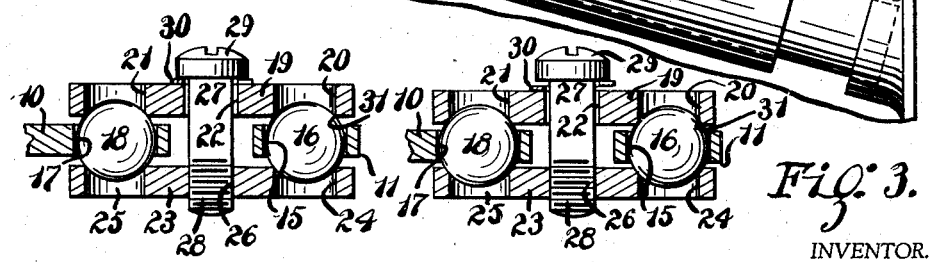
Fig. 2.   Fig. 3.
INVENTOR.
Richard T. Hennessy
BY Hood & Hahn
ATTORNEYS Patented Apr. 28, 1942

2,281,098

UNITED STATES PATENT OFFICE 2,281,098

CONNECTOR

Richard T. Hennessy, Indianapolis, Ind., assignor to Climax Machinery Company, Indianapolis, Ind., a corporation of Indiana Application April 26, 1941, Serial No. 390,635

15 Claims. (Cl. 74—579)

The present invention relates to connectors, and the primary object of the invention is to provide a pivotal connector in which there shall be no lost motion, while obviating the necessity of working to extremely close tolerances in the manufacture of the elements of the connector. A further object of the invention is to produce a joint of the character above described in which it is possible to compensate for wear of the parts thereof by making a very simple, quick adjustment. A still further object of the invention is to provide, in such a joint, means which will automatically and incrementally compensate for wear on the parts of the joint during use and without attention, within the reasonable range of such compensating means. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims are not violated.

Fig. 1 is a fragmentary plan view of one organization in which my improved connector finds utility.

Fig. 2 is an enlarged sectional view taken substantially on the line 2—2 of Fig. 1 and looking in the direction of the arrows; and Fig. 3 is a view similar to Fig. 2 but showing the parts of my connector in the position which they assume as wear occurs upon certain of such parts.

In the drawing, I have illustrated a part of the guard-shifting mechanism of a slicing machine. A bracket 12 which carries the guard is mounted to slide longitudinally of a rod 13. A bell crank lever 10 is connected, through linkage indicated generally by the reference numeral 14, to a plate 11 adjustably mounted on the bracket 12. Obviously, such a connection must include two pivotal joints.

It is desirable that, in a slicing machine, the guard should be adjustable with a high degree of delicacy through at least a part of its range of movement. Therefore it is necessary to avoid lost motion in the shifting train, so that a given position of the handle of lever 10 will always result in the same position of the guard. Ordinary pin-and-hole pivotal joints are inherently sloppy unless the pins and holes are machined to an extremely close tolerance; and furthermore there is always some difficulty in holding pivot pins in position with a proper degree of tightness which shall not be too high or too low. Obviously, the cost of machining the pins and holes of ordinary pivotal joints to such a degree of perfection as to prevent an amount of lost motion which would be detrimental to the mechanism herein considered is comparatively high. Furthermore, when wear occurs in a joint of that character, both the pin and the perforated element must ordinarily be replaced in order to correct the condition resulting from wear; and that necessity not only is expensive in material, but further requires a shut down of the machine during the time required to disassemble the joint and reassemble the new elements.

According to the present invention, all of these difficulties are overcome. The end of the plate 11 and the short arm of the lever 10 are formed with perforations 15 and 17, which are machined to a close tolerance. The perforation 15 snugly receives a hardened ball 16 the diameter of which is substantially identical with the diameter of the perforation 15; and the perforation 17 receives a similar hardened ball 18, the diameter of which is substantially identical with the diameter of the perforation 17. A link 19 is formed with two holes 20 and 21, the diameters of which are less than the diameters of the balls 16 and 18, respectively, but bear a ratio to the ball diameters of at least 1:1.42. Each of the holes 20 and 21 terminates, at its lower end, in a square edge; and, because of the above-identified ratio between the diameters of the holes and the balls, those edges will engage the balls in line contacts at a level such that the angle between a radius of the ball perpendicular to the wall of the perforation in which the ball is received, and a radius of the ball meeting the line of contact of the associated link perforation shall be not greater than 45 degrees.

Between the holes 20 and 21 the link 19 is formed with a perforation 22.

A second link 23 is similar to the link 19 in that it is formed with holes 24 and 25 identical with the holes 20 and 21 of link 19; and the link 23 is formed with a central threaded opening 26. A headed bolt 27 passes freely through the hole 22 and is threaded at one end, as at 28, for reception in the threaded opening 26. Between the head 29 of the bolt 27 and the upper surface of the link 19 is received a heavy spring washer 30; and when the joint is initially assembled, the bolt 27 is turned down sufficiently to clamp the two links 19 and 23 together upon the balls 16 and 18, diametrically opposite positions of each ball being received, respectively, in aligned holes in the links 19 and 23; and the washer 30 being completely collapsed.

It will be readily perceived that this arrangement provides a connection between the lever arm 10 and the plate 11 in which there can be no lost motion, since the inner edges of the link holes grip the balls 16 and 18 solidly and with no possibility of relative motion in the direction of application of force.

As has been stated, the balls 16 and 18 are hardened. Any wear which occurs will be upon the edges of the link holes. In Fig. 3, I have shown the joint of Fig. 2 after the occurrence of some wear. It will be seen that the balls 16 and 18 have worn part-spherical seats in the edges of the link holes; but that the washer 30 has automatically compensated for that wear by expanding between the head 29 of the bolt 27 and the upper surface of the link 19, thereby maintaining the links properly seated against the balls to transmit force from the lever 10 to the plate 11 without lost motion.

Obviously, excessive wear might reduce the edges of the link holes beyond the capacity of the washer 30 to compensate; but, even in such an eventuality, the joint can be retightened and reconditioned for satisfactory operation through the simple expedient of turning the bolt 27 farther into the link 23, without disassembling the joint or replacing any parts.

Numerous other forms of specific mechanism may be designed to produce the essential functions of the specific connector means particularly illustrated and described herein; the essentials of mechanical form being specified in the appended claims.

I claim as my invention:

1. A connector for connecting a first member and a second member comprising a cylindrical perforation formed in each of said members, a ball received in each of said perforations, the diameter of each of said balls being substantially identical with the diameter of the perforation in which it is received, a link formed with two spaced, paraxial, cylindrical holes, the diameters of said holes being less than the diameters of said balls, and means for pressing said link into contact with said balls, each of said holes receiving a portion of one of said balls.

2. A connector for connecting a first member and a second member comprising a cylindrical perforation formed in each of said members, a ball received in each of said perforations, the diameter of each of said balls being substantially identical with the diameter of the perforation in which it is received, a link formed with two spaced, paraxial, cylindrical holes, the diameters of said holes being less than the diameters of said balls, and means for resiliently pressing said link into contact with said balls, each of said holes receiving a portion of one of said balls.

3. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial, cylindrical holes, the diameters of said holes being less than the diameters of said balls and the holes of one link being respectively registrable with the holes of the other link, said two links being respectively positioned on opposite sides of said members, and means urging said links toward each other, with diametrically opposite portions of each ball received in registering holes in the two links.

4. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, and means resiliently urging said links toward each other, with diametrically opposite portions of each ball received in registering holes in the two links.

5. A connector for connecting a first member and a second member comprising a cylindrical perforation formed in each of said members, a ball received in each of said perforations, the diameter of each of said balls being substantially identical with the diameter of the perforation in which it is received, a link formed with two spaced, paraxial, cylindrical holes, the diameters of said holes bearing a ratio to the diameters of said balls greater than 1:1.4 but less than 1:1, and means for pressing said link into contact with said balls, each of said holes receiving a portion of one of said balls.

6. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members and clamp means cooperating with said links to seat the same solidly against diametrically opposite portions of said balls with one hole of each link receiving a portion of each ball and with aligned link holes receiving diametrically opposite portions of the same ball.

7. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, clamp means cooperating with said links to seat the same solidly against diametrically opposite portions of said balls with one hole of each link receiving a portion of each ball and with aligned link holes receiving diametrically opposite portions of the same ball, and spring means cooperating with said clamp means to maintain said links resiliently seated upon said balls after wear between said balls and said links.

8. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, and threaded means cooperating with said links to draw the same together solidly against diametrically opposite portions of said balls with one hole of each link receiving a portion of each ball and with aligned link holes receiving diametrically opposite portions of the same ball.

9. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, threaded means cooperating with said links to draw the same together solidly against diametrically opposite portions of said balls with one hole of each link receiving a portion of each ball and with aligned link holes receiving diametrically opposite portions of the same ball, and spring means cooperating with said links and with said threaded means to maintain said links resiliently seated upon said balls after wear between said balls and said links.

10. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, means including a headed bolt cooperating with said links to draw the same together solidly against diametrically opposite portions of said balls with one hole of each link receiving a portion of each ball and with aligned link holes receiving portions of the same ball, and heavy spring means confined between the head of said bolt and the adjacent link and operable automatically, upon the occurrence of wear between said balls and said links, to maintain the engagement between said balls and said links.

11. A connector for connecting a first member and a second member comprising a cylindrical perforation formed in each of said members, a ball received in each of said perforations, the diameter of each of said balls being substantially identical with the diameter of the perforation in which it is received, a pair of links, each of said links being formed with two spaced, paraxial cylindrical holes, the diameters of said holes being less than the diameters of said balls and the holes of one link being respectively registrable with the holes of the other link, said two links being respectively positioned on opposite sides of said members, means including a headed bolt cooperating with said links to draw the same together solidly against diametrically opposite portions of said balls with one hole of each link receiving a portion of each ball and with aligned link holes receiving portions of the same ball, and a spring washer collapsed between the head of said bolt and the adjacent link and operable automatically, upon the occurrence of wear between said balls and said links, to maintain the engagement between said balls and said links.

12. Connector means for a first member and a second member comprising two elements and at least one link, each of said elements being associated with one of said members and with said link, each of said elements being formed with a portion extending in a direction perpendicular to the plane of transmission of force therethrough, said portion being of progressively smaller dimensions in planes parallel with said transmission plane, the said extending portion of each of said elements being received in a hole in another element of such connector means, each of said holes terminating in a substantially square edge engaging the surface of the extending portion of the associated element and bounded by walls less rapidly approaching each other than do the surfaces of the extending portions of said elements, and means for holding said edges seated on said elements.

13. Connector means for a first member and a second member comprising means associated with each of said members and including a portion extending in a direction perpendicular to the plane of transmission of force therethrough, said portion being of progressively smaller dimensions in planes parallel with said transmission plane, a link, each of said extending portions being seated in a hole in said link, each of said holes terminating in a substantially square edge engaging the surface of the associated portion and bounded by walls less rapidly approaching each other than do the surfaces of the associated extending portion, and means for holding said extending portion seated on said edges.

14. Connector means for a first member and a second member comprising means associated with each of said members and including a portion extending in a direction perpendicular to the plane of transmission of force therethrough, said portion being of progressively smaller dimensions in planes parallel with said transmission plane, a link, each of said extending portions being seated in a hole in said link, each of said holes terminating in a substantially square edge engaging the surface of the associated portion and bounded by walls less rapidly approaching each other than do the surfaces of the associated extending portion, and spring means for holding said extending portions resiliently seated against said edges.

15. Connector means for a first member and a second member comprising means associated with one of said members and including a portion extending in a direction perpendicular to the plane of transmission of force therethrough, said portion being of progressively smaller dimensions in planes parallel with said transmission plane, a link associated with the other of said members, said link being formed with a seat providing a substantially square edge engaging the surface of said extending portion, said seat being defined by walls retreating from said edge and approaching each other less rapidly than do the surfaces of said extending portion, and means holding said extending portion surfaces in contact with said edge.

RICHARD T. HENNESSY.